Patented May 20, 1941

2,242,490

UNITED STATES PATENT OFFICE 2,242,490

NITROGENOUS CONDENSATION PRODUCT FROM 1.2-ALKYLENE IMINES

Heinrich Ulrich and Karlhugo Kuespert, Ludwigshafen-on-the-Rhine, Germany, assignors, by mesne assignments, to General Aniline & Film Corporation, New York, N. Y., a corporation of Delaware No Drawing. Application January 21, 1939, Serial No. 252,120. In Germany January 25, 1938

18 Claims. (Cl. 260—239)

The present invention relates to a new nitrogenous condensation products and a process of producing same.

In the copending application Ser. No. 93,767, filed on August 1, 1936, in the name of Heinrich Ulrich, one of the inventors of the present invention, there is described a process for the production of nitrogenous products which consists in causing alkylene imines to react with organic compounds containing at least one group capable of reacting with basic compounds. The alkylene imines may be employed in the monomeric or polymeric form. The reaction of alkylene imines with aliphatic isocyanic acid esters is also described, inter alia.

We have now found that very valuable nitrogenous condensation products are also obtained by using saturated aliphatic isothiocyanic acid esters instead of the aliphatic isocyanic acid esters. Among suitable isothiocyanic acid esters there may be mentioned for example methyl, ethyl, propyl, isopropyl, normal-butyl, isobutyl and octyl mustard oils. The alkylene imines to be employed comprise monomeric 1.2-alkylene imines as well as polymerization products of 1.2-alkylene imines of any desired degree of polymerization.

The reaction conditions and the properties of the products are similar to those described in the said application Ser. No. 93,767.

The following example will further illustrate the nature of this invention but the invention is not restricted to this example. The parts are by weight.

Example 430 parts of polymeric ethylene imine are intimately mixed with about 100 parts of butyl mustard oil. With evolution of heat, a white mass is formed which is soluble with difficulty in water and more readily soluble in hot alcohol. The product may be used for rendering fibrous materials water-repelling.

What we claim is:

1. The process of producing nitrogenous products, which comprises condensing a 1.2-alkylene imine with a saturated aliphatic isothiocyanic acid ester.
2. The process of producing nitrogenous products, which comprises condensing a 1.2-alkylene imine with butyl mustard oil.
3. The process of producing nitrogenous products, which comprises condensing a polymerization product of 1.2-alkylene imine with a saturated aliphatic isothiocyanic acid ester.
4. The process of producing nitrogenous products, which comprises condensing a polymerization product of 1.2-alkylene imine with butyl mustard oil.
5. Nitrogenous condensation products from 1.2-alkylene imines and saturated aliphatic isothiocyanic acid esters.
6. Nitrogenous condensation products from 1.2-alkylene imines and butyl mustard oil.
7. Nitrogenous condensation products from polymerization products of 1.2-alkylene imines and saturated aliphatic isothiocyanic acid esters.
8. Nitrogenous condensation products from polymerization products of 1.2-alkylene imines and butyl mustard oil.
9. The process of producing nitrogenous products which comprises condensing ethylene imine with a saturated aliphatic isothiocyanic acid ester.
10. The process of producing nitrogenous products which comprises condensing ethylene imine with butyl mustard oil.
11. The process of producing nitrogenous products which comprises condensing polymerization product of ethylene imine with a saturated aliphatic isothiocyanic acid ester.
12. The process of producing nitrogenous products which comprises condensing polymerization product of ethylene imine with butyl mustard oil.
13. Nitrogenous condensation products from ethylene imine and saturated aliphatic isothiocyanic acid esters.
14. Nitrogenous condensation products from ethylene imine and butyl mustard oil.
15. Nitrogenous condensation products from polymerization product of ethylene imine and saturated aliphatic isothiocyanic acid esters.
16. Nitrogenous condensation products from polymerization product of ethylene imine and butyl mustard oil.
17. The process of producing nitrogenous products which comprises condensing a member of the group consisting of 1.2-alkylene imines and polymerization products of 1.2-alkylene imines with a saturated aliphatic isothiocyanic acid ester.
18. Nitrogenous condensation products from a member of the group consisting of 1.2-alkylene imines and polymerization products of 1.2-alkylene imines and saturated aliphatic isothiocyanic acid esters.

HEINRICH ULRICH.
KARLHUGO KUESPERT.